United States Patent [19]

Katayama

[11] Patent Number: 4,762,015

[45] Date of Patent: Aug. 9, 1988

[54] TILTABLE VEHICLE STEERING COLUMN ASSEMBLY

[75] Inventor: Kazuo Katayama, Hiroshima, Japan

[73] Assignee: Mazda Motor Corporation, Hiroshima, Japan

[21] Appl. No.: 923,861

[22] Filed: Oct. 28, 1986

[30] Foreign Application Priority Data

Oct. 31, 1985 [JP] Japan ................ 60-244833
Oct. 31, 1985 [JP] Japan ................ 60-244834
Oct. 31, 1985 [JP] Japan ................ 60-244836

[51] Int. Cl.$^4$ ............................. B62D 1/18
[52] U.S. Cl. .................... 74/473 SW; 74/486; 74/493; 74/535; 280/775
[58] Field of Search .............. 74/473 SW, 493, 486, 74/535; 280/775

[56] References Cited

U.S. PATENT DOCUMENTS

| 1,347,502 | 7/1920 | Frogh | 74/493 X |
|---|---|---|---|
| 1,367,695 | 2/1921 | Gray | 74/493 |
| 2,852,956 | 9/1958 | May | 74/493 |
| 4,132,123 | 1/1979 | Ishii et al. | 74/473 SW |
| 4,267,743 | 5/1981 | Tanaka | 74/493 X |
| 4,537,088 | 8/1985 | Kubota | 74/473 SW |
| 4,594,909 | 6/1986 | Yamaguchi | 74/493 |

FOREIGN PATENT DOCUMENTS

| 58-75175 | 5/1983 | Japan . | |
|---|---|---|---|
| 930764 | 7/1963 | United Kingdom | 74/493 |

*Primary Examiner*—Allan D. Herrmann
*Attorney, Agent, or Firm*—Fleit, Jacobson, Cohn & Price

[57] ABSTRACT

A tiltable vehicle steering column assembly including a steering shaft assembly constituted by an upper shaft and a lower shaft which are connected together by a first universal joint. A transmission shift rod assembly is provided on the steering shaft assembly and constituted by an upper rod portion and a second rod portion which are connected together by a second universal joint so that the upper rod portion can be tiltably moved together with the upper shaft of the steering shaft assembly. The second universal joint is located at a side of and in the same heightwise position as the first universal joint so that the upper rod portion of the shift rod assembly is not relatively moved with respect to the upper shaft of the steering shaft assembly when the steering shaft assembly is tiltably moved.

12 Claims, 7 Drawing Sheets 4,762,015

TILTABLE VEHICLE STEERING COLUMN ASSEMBLY

BACKGROUND OF THE INVENTION

1. Field of the Invention

The present invention relates to a vehicle steering column assembly and more particularly to a tiltable vehicle steering column assembly. More specifically, the present invention pertains to a tiltable vehicle steering column assembly having a transmission shift rod assembled on the steering column.

2. Description of the Prior Art

A tiltable steering column assembly is well known in the art and appreciated as being able to locate the steering wheel at an appropriate position with respect to the driver. It has also been well known in the art to provide the tiltable steering column assembly with a transmission shift rod which is also tiltable together with the steering column. For example, Japanese utility model application No. 56-170827 filed on Nov. 18, 1981 and disclosed for public inspection on May 20, 1983 under disclosure No. 58-75175 discloses a steering column assembly having a steering shaft structured for vertical tilting movements. A transmission shift rod is arranged above the steering shaft to extend substantially parallelly with respect to the steering shaft and can be tiltably moved together with the steering shaft.

The conventional tiltable steering column assembly is disadvantageous in that the geometrical relationship between the steering shaft and the transmission shift rod is changed when a tilting movement is applied to the assembly so that transmission shifting operation may sometimes become difficult. The aforementioned Japanese utility model application proposes to solve the problem by making the upper end portion of the shift rod movable in the longitudinal direction in response to a tilting movement of the steering shaft. For the purpose, there is provided a guide plate which functions to guide the upper end portion of the shift rod in the longitudinal direction so that the upper end portion of the shift rod is appropriately located with respect to the steering shaft under any tilted position of the steering shaft. The proposed structure is however disadvantageous in that the mechanism is complicated.

SUMMARY OF THE INVENTION

It is therefore an object of the present invention to provide a tiltable steering column assembly having a transmission shift rod assembled thereon in such a manner that the geometrical relationship between the steering shaft and the transmission shift rod can substantially be maintained in any tilted position of the steering shaft.

Another object of the present invention is to provide a tiltable vehicle steering column assembly having a transmission shift rod assembled thereon which is simple in structure but can maintain the geometrical relationship between the steering shaft and the transmission shift rod in any tilted position of the steering shaft.

According to the present invention, the above and other objects can be accomplished by arranging the universal joint of the transmission shift rod at a transversely side portion of the universal joint of the steering shaft so that the universal joint of the shift rod is located substantially at the same height with respect to the universal joint of the steering shaft. Thus, according to the present invention, there is provided a tiltable vehicle steering column assembly including steering shaft means comprising an upper shaft portion and a lower shaft portion which are connected together by first universal joint means, support means for supporting said upper shaft portion of the steering shaft means for vertical tilting movements about said first universal joint means, transmission shift rod means having an upper rod portion and a lower rod portion which are connected together by second universal joint means, said upper rod portion being connected with said upper shaft portion so that the upper rod portion is tiltably moved about said second universal joint means in response to a tiltable movement of the upper shaft portion, said upper rod portion of the transmission shift rod means being located at a transversely side portion of the upper shaft portion of the steering shaft means and extending substantially parallelly with said upper shaft portion, said second universal joint means being located at a transversely side portion of and at the same heightwise position with respect to the first universal joint means.

The upper shaft portion of the steering shaft means may be enclosed by a hollow steering column which is also tiltably mounted. The upper rod portion of the shift rod means may then be supported by the steering column so that it is tiltably moved together with the upper shaft portion of the steering shaft means. The steering column may have guide means for guiding the upper portion of the shift rod means to move to a selected one of a plurality of shift positions. The shift rod means may be provided preferably in the lower rod portion with absorber means for absorbing longitudinal shock loads.

The above and other objects and features of the present invention will become apparent from the following description of preferred embodiments taking reference to the accompanying drawings.

BEIEF DESCRIPTION OF THE DRAWINGS

FIG. 2A is a sectional view taken along a line 2A—2A in FIG. 2;

DESCRIPTION OF THE PREFERRED EMBODIMENTS

Figure 1:
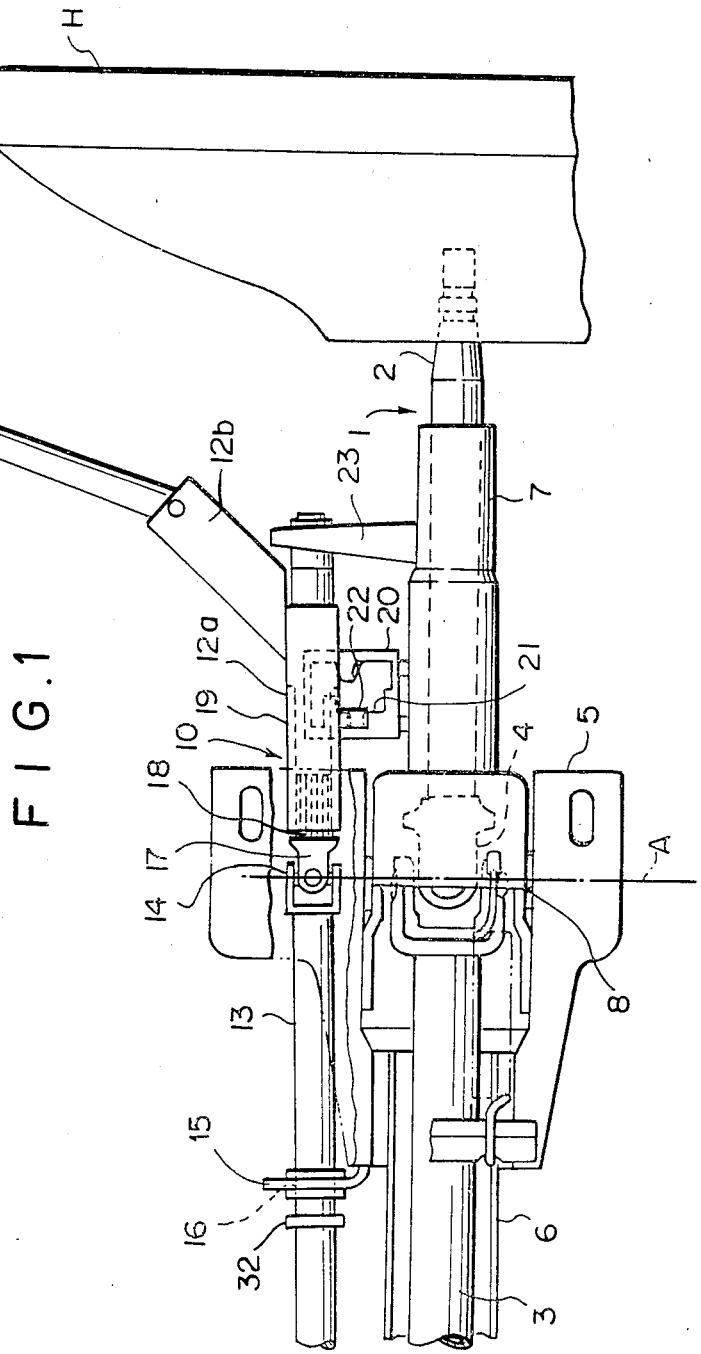
FIG. 1 is a plan view of a vehicle steering column assembly in accordance with one embodiment of the present invention.
Figure 2:
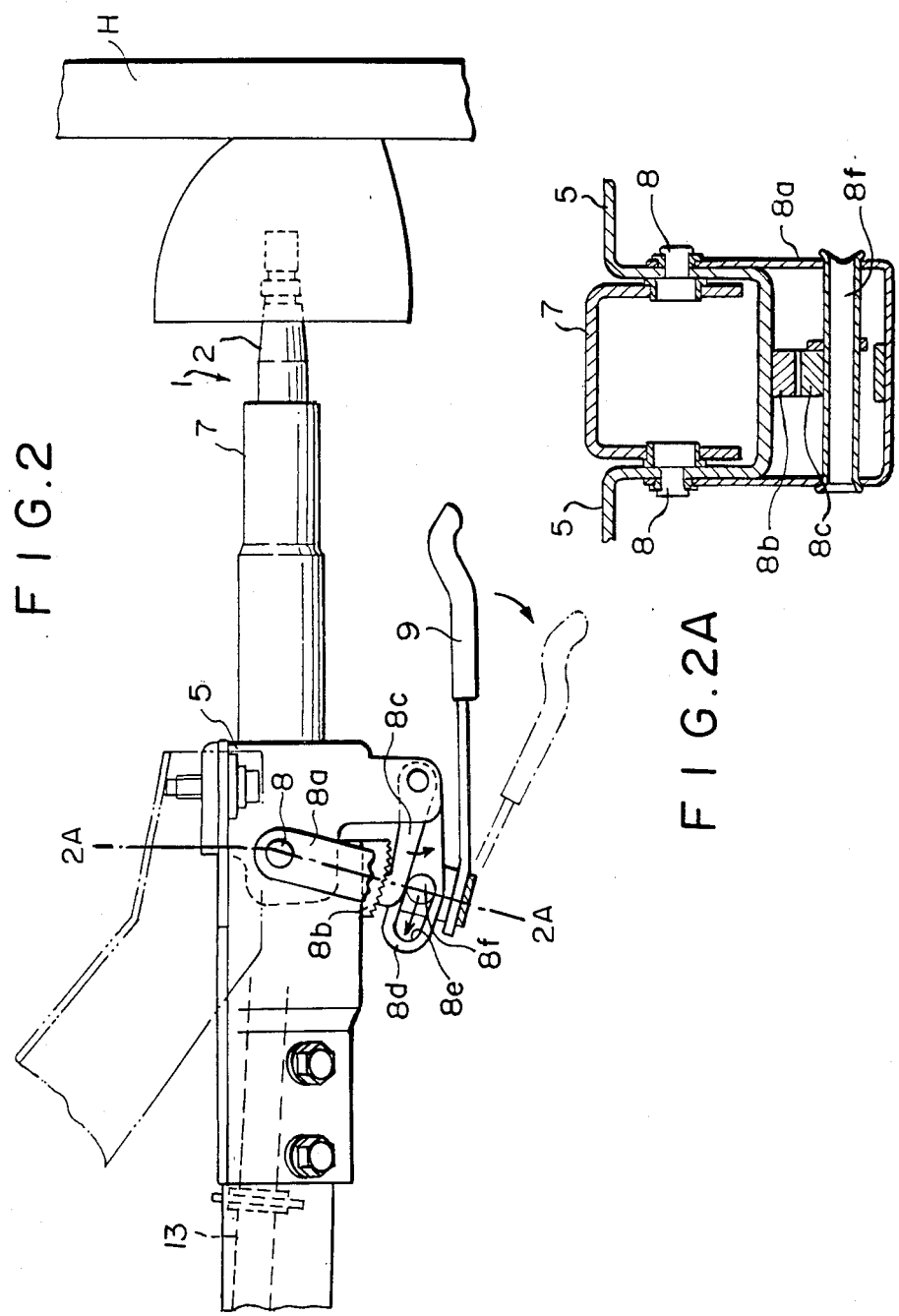
FIG. 2 is a side view of the steering column assembly shown in FIG. 1.
Figure 3:
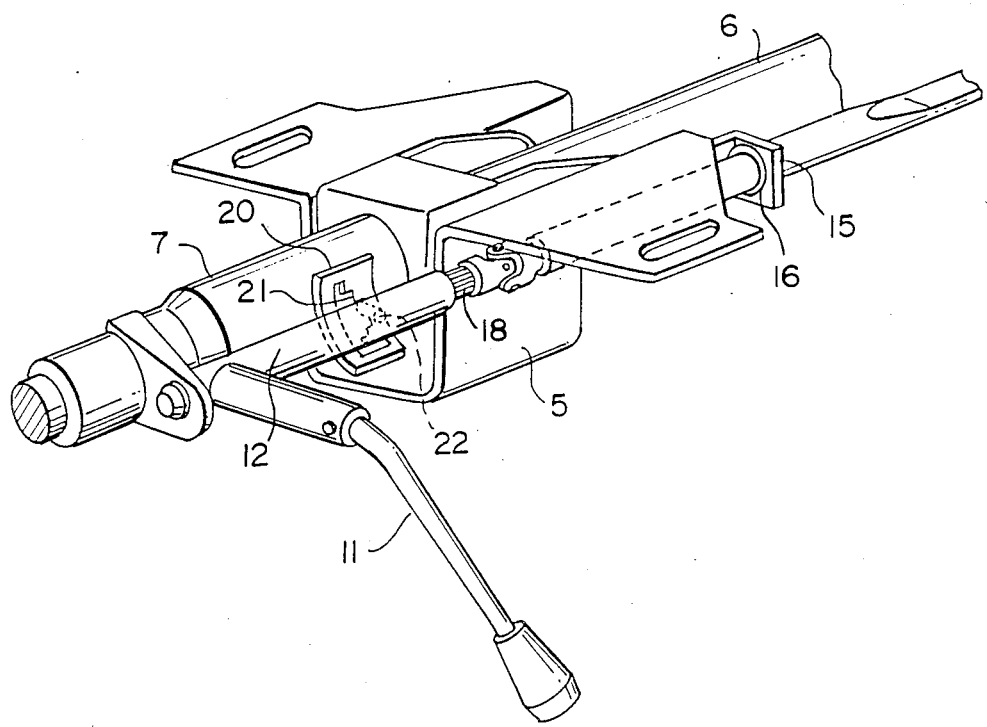
FIG. 3 is a perspective view of the steering column assembly shown in FIGS. 1 and 2.

Referring to the drawings, particularly to FIGS. 1 through 3, the vehicle steering column assembly shown therein includes a steering shaft assembly 1 comprising an upper shaft portion 2 having one end connected with a steering wheel H and a lower shaft portion 3 having one end connected through a universal joint assembly 4 with the other end of the upper shaft portion 2. The lower shaft portion 3 is positioned in a hollow lower steering column 6 and rotatably supported thereby in a conventional manner. The lower steering column 6 is supported at one end to a vehicle body B through a substantially U-shaped bracket 5.

The upper shaft portion 2 is positioned in an upper steering column 7 and rotatably supported thereby. The upper steering column 7 has a lower end connected with the bracket 5 for tilting movement in a substantially vertical plane about a horizontal axis A which passes through the center of the universal joint 4. For the purpose, the upper steering column 7 has a pair of diametrically opposite, radially outwardly extending pins 8 which are carried by the bracket 5. As shown in FIG. 2A, a channel-shaped locking lever 8a is mounted at the opposite leg portions on the pins 8 for swingable movements. A manual actuating lever 9 is attached to the lever 8a so that an actuation of the lever 9 in a direction shown by an arrow in FIG. 2 causes a swingable movement of the locking lever 8 about the pins 8. In FIG. 2A, it will further be noted that the bracket 5 is provided with a rachet plate 8b having rachet teeth. The bracket 5 carries a rachet pawl 8c which is swingably mounted at one end on the lower end portion of the bracket. The pawl 8c is positioned to engage at the other end with the rachet teeth on the rachet plate 8b. A guide lever 8d is mounted at one end on the lower end portion of the upper steering column 7 for swingable movement and has a guide slot 8e as shown in FIG. 2. The locking lever 8a has a locking pin 8f extending between the legs of the locking lever 8a and engaged with the slot 8e in the guide lever 8d. The locking pin 8f is adapted to engage the back side edge of the rachet pawl 8c so that when the pin 8f is positioned as shown in FIG. 2 the pin 8f functions to hold the pawl in the position engaged with the rachet teeth in the rachet plate 8b. When the locking lever 8a is swingably moved forward by operating the lever 9, the pin is moved out of engagement with the rachet pawl 8c so that the upper steering column 7 is unlocked. It will therefore be understood that the tilting angle of the upper steering column 7 can be adjusted by at first unlocking the upper steering column 7, then moving it to a desired tilting position and thereafter locking the column 7 through an operation of the lever 9.

Along the right side of the steering shaft assembly 1, there is a transmission shift rod assembly 10 as shown in FIG. 1. The shift rod assembly 10 includes an upper rod 12 and a lower rod 13 which are connected together through a universal joint 14 having a center located on the aforementioned horizontal axis A. The lower rod 13 is carried for longitudinal sliding movement and for rotation about its axis by means of a bearing 16 provide on a support flange 15 which is formed integrally with the bracekt 5.

Figure 4:
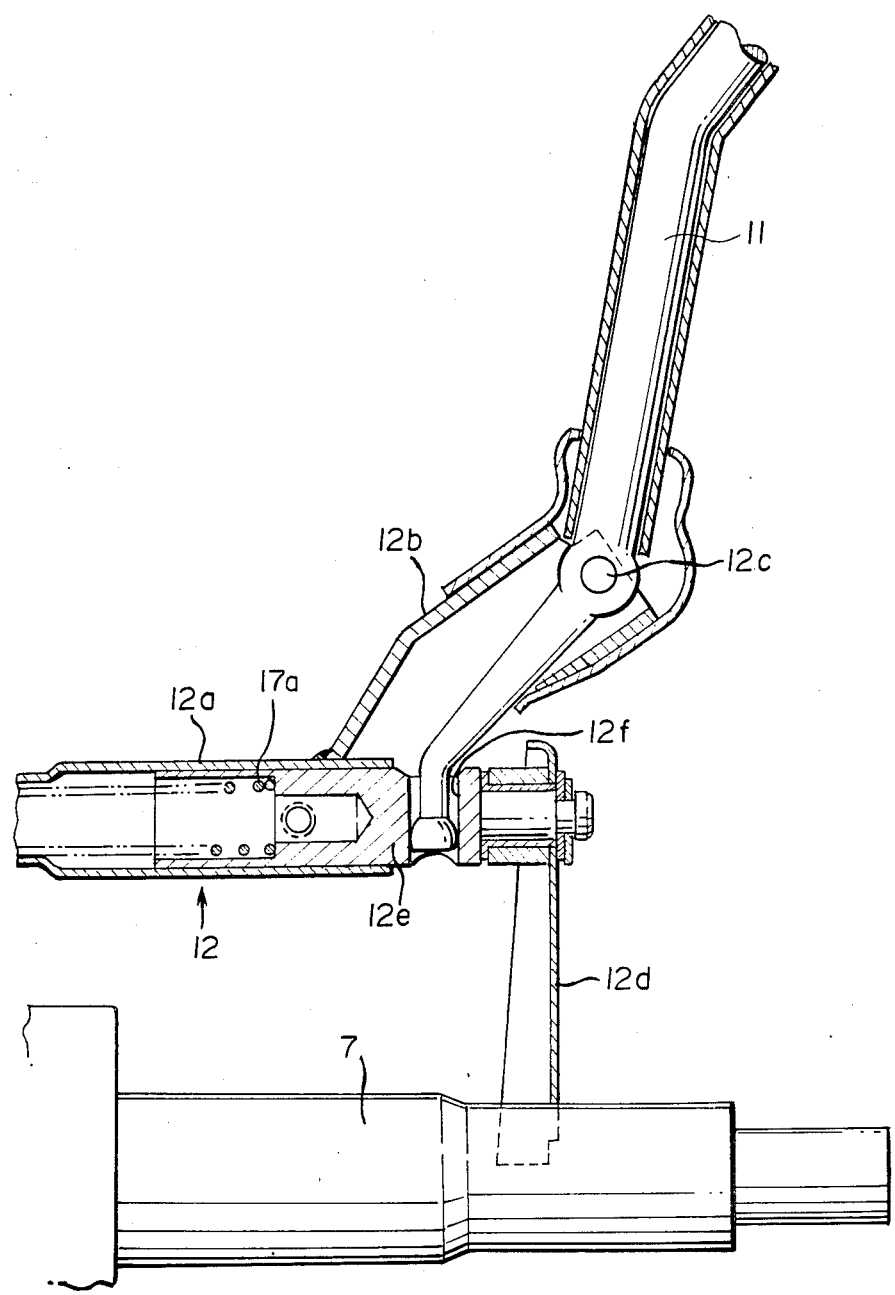
FIG. 4 is a sectional view showing the connection between the transmission shift lever and the shift rod.

As shown in FIG. 4, the upper rod 12 has at an upper end a tubular portion 12a which is connected with a sidewardly extending support arm 12b. A manual shift lever 11 is mounted on the arm 12b by a vertical pin 12c for swingable movement about the pin 12c. A support bracket 12d is attached to the upper steering column 7 and extends sidewardly. The bracket 12d supports a fulcrum rod 12e which extends towards the upper shift rod 12 and inserted into the tubular portion 12a of the upper rod 12 for rotation and axial sliding movement. The fulcrum rod 12e has a radial hole 12f and the manual lever 11 has a fulcrum end received in the hole 12f. It will therefore be understood that an actuation of the manual lever 11 causes a swingable movement of the lever 11 about the fulcrum end of the lever 11 and the swingable movement is transmitted through the pin 12c to the upper shift rod 12 producing an axial sliding movement and/or rotation of the upper shift rod 12. It will be noted in FIGS. 1 through 3 that the upper shift rod 12 is constituted by a rod end 17 and a rod body 19 which has the aforementioned tubular portion 12a. The rod end 17 is connected with the rod body 19 by means of splines 18 so that the rod body 19 is axially movable with respect to the rod end 17 but rotates with the rod end 17. A spring 17a (FIG. 4) is fitted between the rod end 17 and the fulcrum rod 12e.

It will be noted that an adjustment in the tilting angle of the upper steering column 7 will automatically produce a tilting adjustment of the upper shift rod 12. The location of the universal joint 14 with respect to the universal joint 4 is effective to prevent any relative movment between the upper steering column 7 and the upper shift rod 12.

Figure 6:
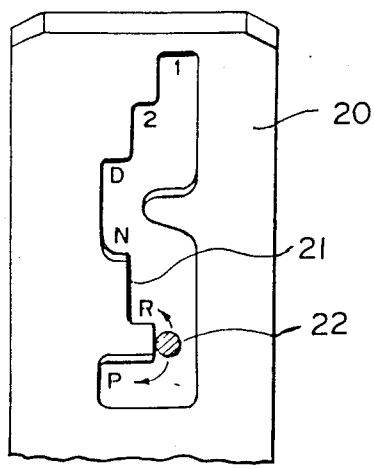
FIG. 6 is a side view showing the transmission shift guide plate.
Figure 7:
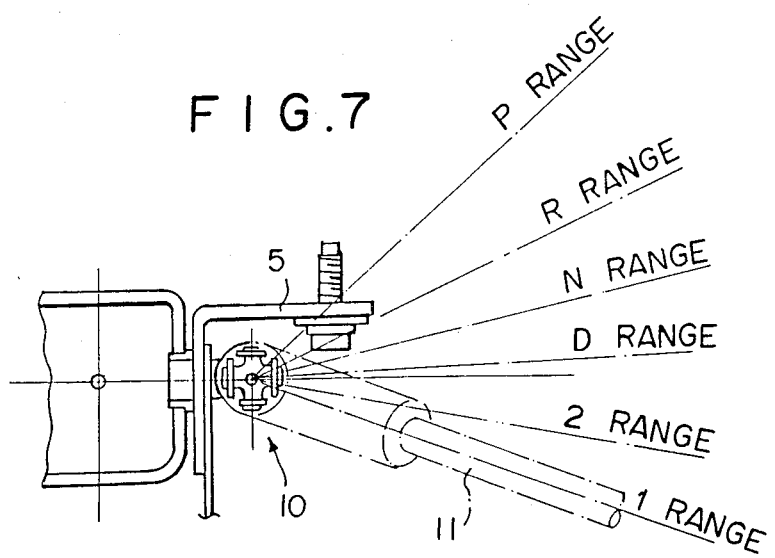
FIG. 7 is a view showing the shift positions.

A guide plate 20 is attached to the upper steering column 7 and has a guide slot 21. The upper shift rod 12 has a radially extending pin 22 which is engaged with the guide slot 21. FIG. 6 shows an example of the guide slot 21 for a vehicle having an automatic transmission. The shift range positions are shown in FIG. 7. For an automatic transmission, it is necessary to transmit only the rotation of the upper shift rod 12. However, in order that the driver can feel the shift position, the slot has the configuration as shown in FIG. 6. With the configuration of the slot 21 as shown in FIG. 6, the rod body 19 is axially moved when the shift range is changed for example from the D or N range to R or 2 range. However, the axial movement is absorbed by the connection of the rod body 19 and the rod end 17 through the spline 18.

Figure 5:
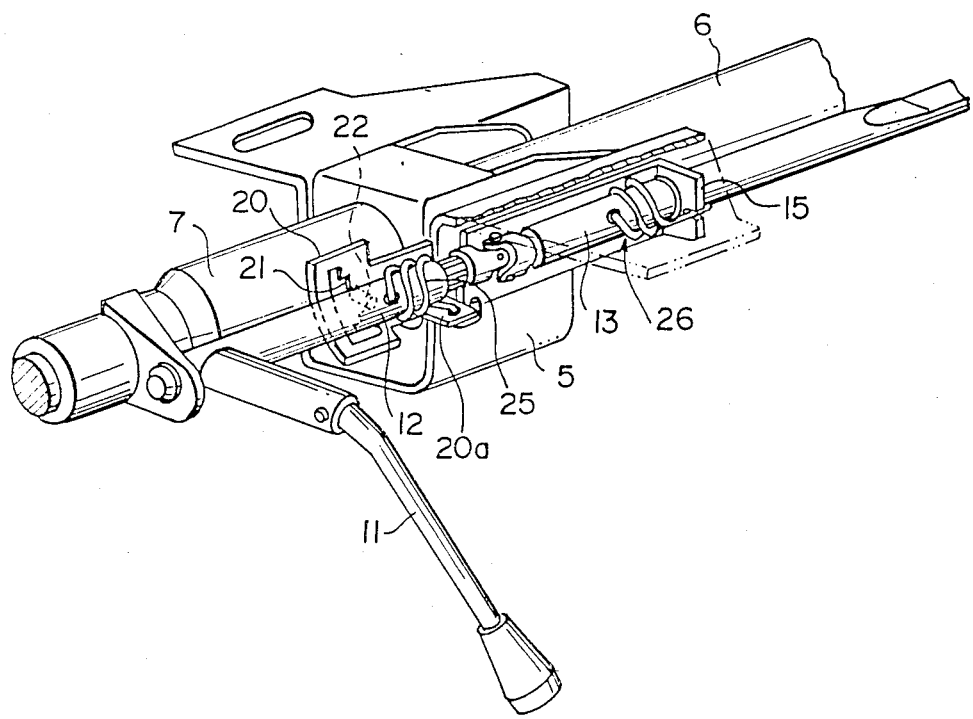
FIG. 5 is a perspective view similar to FIG. 3 but showing another emodiment.

FIG. 5 shows another embodiment in which the guide plate 20 is formed with a sideward extension 20a and a torsion spring 25 is provided around the upper shift rod 12 and has one end engaged with the extension 20a on the guide plate 20 and the other end with the rod 12 to bias the upper shift rod 12 in one rotational direction. A second torsion spring 26 is provided around the lower shift rod 13 and has one end engaged with the flange 15 on the bracket 5 and the other end with the rod 13 to bias the rod 13 in the same rotational direction as the spring 25 biases the rod 12.

Figure 8:
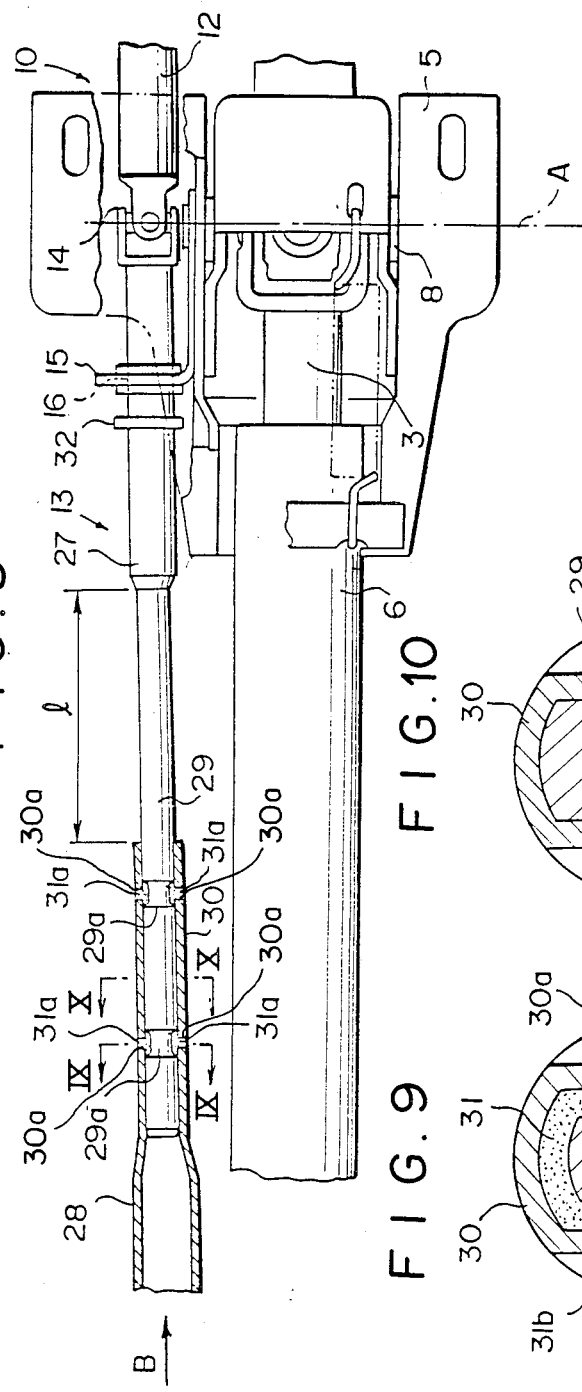
FIG. 8 is a sectional view showing a further embodiment.
Figure 10:
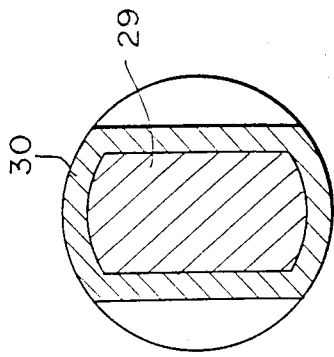
FIG. 10 is a sectional view taken along the line X—X in FIG. 8.
Figure 9:
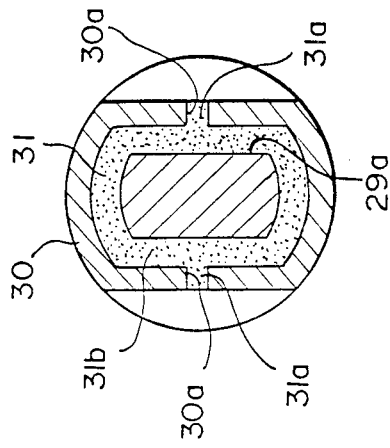
FIG. 9 is a sectional view taken along the line IX—IX in FIG. 8.

Referring now to FIGS. 8 through 10, it will be noted that in the embodiment shown therein the lower shift rod 13 is provide with an energy absorbing device. The rod 13 is constituted by a rod section 27 and a tube 28. The rod section 27 has a lower portion 29 having a cross-section as shown in FIG. 10. The lower portion 29 of the rod section 27 is inserted into a correspondingly shaped upper portion 30 of the tube 28. Thus, the rod section 27 is axially slidable with respect to the tube 28 but rotates together with the tube 28. The lower portion 29 of the rod section 27 is formed with peripheral grooves 29a and the portion 30 of the tube 28 is formed with radial holes 30a at axial portions corresponding to the grooves 29a. Resin is injected into the spaces formed between the rod section 27 and the tube 28 at the positions of the grooves 29a. The portions of the resin 31a filling the holes 30a form shear pins which are integral with the peripheral portions 31b. When a shock load is applied to the shift rod assembly under for example a forward collision as shown by an arrow B in FIG. 8, the shear pins 31a are broken so that the tube 28 can be axially moved with respect to the rod section 29 by a stroke 1 so that the shock energy is absorbed. It should further be noted that the rod section 27 is formed with a stopper flange 32 which is normally located with a space from the flange 15 but is adapted to be engaged in case of an accident with the flange 15 to prevent the shift rod assembly from moving toward the driver.

The invention has thus been shown and described with reference to specific embodiments, however, it should be noted that the invention is in no way limited to the details of the illustrated structures but changes and modifications may be made without departing from the scope of the appended claims.

What is claimed is:

1. A tiltable vehicle steering column assembly including steering shaft means comprising an upper shaft portion and a lower shaft portion which are connected together by first universal joint means, an upper steering column housing said upper shaft portion, a lower steering column housing said lower shaft portion, said upper and lower steering columns being connected together for vertical tilting movements with respect to each other about a transverse axis passing through said first universal joint means, automatic transmission shifting shift rod means having an upper rod portion and a lower rod portion which are connected together by second universal joint means, said upper rod portion being connected with said upper shaft portion so that the upper rod portion is tiltably moved about said second universal joint means in response to a tiltable movement of the upper shaft portion, said upper rod portion of the transmission shift rod means being located at a transversely side portion of the upper shaft portion of the steering shaft means and extending substantially parallelly with said upper shaft portion, said second universal joint means being located on said transverse axis at a transversely side portion of and at the same heightwise position with respect to the first universal joint means.

2. A steering column assembly in accordance with claim 1 which includes locking means for locking the upper steering column at a desired tilting angle position.

3. A steering column assembly in accordance with claim 2 in which a shift rod guide means is provided on said upper steering column for guiding the upper rod portion of the shift rod means.

4. A steering column assembly in accordance with claim 3 in which said shift rod guide means includes a guide plate provided on the upper steering column and having a guide slot, said upper rod portion of the shift rod means being provided with a guide pin which is engaged with said guide slot in the guide plate.

5. A steering column assembly in accordance with claim 4 in which said guide slot in the guide plate is of a configuration such that an axial movement of the upper rod portion is produced when the shift rod means is moved from one shift range to another, said upper rod portion including a rod body and a rod end which are connected together by spline means, said rod end being connected with said second universal joint means.

6. A steering column assembly in accordance with claim 5 in which said guide pin is provided on said rod body.

7. A steering column assembly in accordance with claim 1 in which energy absorbing means is provided in said shift rod means for absorbing a longitudinally transmitted energy.

8. A steering column assembly in accordance with claim 7 in which said energy absorbing means is provided in said lower rod portion of the shift rod means.

9. A steering column assembly in accordance with claim 7 in which said energy absorbing means includes shear pin means and stopper means.

10. A steering column assembly in accordance with claim 9 in which said stopper means is located at a side of the shear pin means adjacent to the second universal joint means.

11. A steering column assembly including steering shaft means comprising an upper shaft portion and a lower shaft portion which are connected together by first universal joint means, support means for supporting said upper shaft portion of the steering shaft means for vertical tilting movements about said first universal joint means, transmission shift rod means having an upper rod portion and a lower rod portion which are connected together by second universal joint means, said upper rod portion being connected with said upper shaft portion so that the upper rod portion is tiltably moved about said second universal joint means in response to a tiltable movement of the upper shaft portion, said upper rod portion of the transmission shift rod means being located at a transversely side portion of the upper shaft portion of the steering shaft means and extending substantially parallelly with said upper shaft portion, said second universal joint means being located at a transversely side portion of and at the same heightwise position with respect to the first universal joint means wherein torsional bias means is provided for biasing said shift rod means in one rotational direction.

12. A steering column assembly in accordance with claim 11 in which said bias means includes a first torsion spring provided to act on the upper rod portion and a second torsion spring provided to act on the lower rod portion.

* * * * *